Patented June 10, 1952

2,599,870

UNITED STATES PATENT OFFICE 2,599,870

RAPID CURING AND LOW-PRESSURE PHENOL-FORMALDEHYDE RESINS

Arie Anton Johannes Sigtermans, The Hague, Netherlands, assignor to Nederlandse Organisatie voor Toegepast-Natuurwetenschappelijk Onderzoek ten behoeve van Nijverheid, Handel en Verkeer, The Hague, Netherlands, a corporation of Holland No Drawing. Application June 15, 1949, Serial No. 99,363. In the Netherlands June 26, 1948

6 Claims. (Cl. 154—43)

Low-pressure resins are applied in the so-called low-pressure laminating, in which one or more layers of a synthetic resin are applied on a fabric or between fabrics, or the fabrics are impregnated. Thereupon the resin is cured at relatively low temperatures and pressures. Another application of low-pressure resins is in the so-called low-pressure molding. For a more elaborate dissertation, reference is made to J. S. Hicks, "Low-Pressure Laminating of Plastics" (New York, 1947).

The branch of industry which is concerned with the above mentioned processes always aims at the production of resins that are capable of curing at lower pressures and temperatures and in a shorter time while retaining a good adhesion between the layers of the laminated material. This may be attained in different ways, i. e. by modifying phenol resins with the aid of resorcinol. In that case a mixture of resorcinol and phenol is used. Thus resorcinol replaces here a part of the phenol.

However, for the production of good low-pressure resins, the proportion of resorcinol must be about 50%, which, in view of the price of resorcinol, will make such resins rather expensive. For example, resins prepared from a mixture of about 3 mols of resorcinol and 1 mol of phenol have a short curing time using an acid catalyst at a pH of about 4. Pure phenol resins require a pH of 0 to 1, such acidity of course being very undesirable in view of the filling materials being attacked by strong acids.

It has now been found possible to prepare from phenol-aldehyde resins good low-pressure resins with the aid of a hardening catalyst, consisting of a mixture of resorcinol and a dioxide of a metalloid from the sixth group of the periodic system. Particularly good results may be obtained with a mixture of resorcinol and selenium dioxide.

The required quantities of catalyst mixture may vary somewhat according to the nature of the phenol resin used. Starting from the normal phenol-formaldehyde condensate a very good low-pressure resin was obtained with 15% of a catalyst mixture, consisting of 2 parts by weight of selenium dioxide and 1 part by weight of resorcinol; the said resin had a curing time of 10 min. at 100° C., and showed at pressures of 1 to 5 kg./cm.² a good adhesion to the fabric, paper, wood or the like.

Good results, however, were also obtained with 10% of selenium dioxide and 10% of resorcinol, and with 5% of selenium dioxide and 10% of resorcinol. With lower proportions of catalyst mixture the curing time becomes longer. So usually the amount of hardening catalyst is not lower than 10% and is preferably 15 to 25%, based on resins.

It is absolutely necessary to use a mixture of resorcinol and a dioxide of a metalloid from the sixth group of the periodical system, as the separate components do not perform the required action on addition to the same resins, and therefore do not show rapid curing and/or good adhesion.

A further advantage of the process according to the invention is that no excess of aldehyde is required in preparing the phenol-aldehyde condensate. The catalyst mixture may be added immediately after the alkaline condensation of the phenol and aldehyde. It will, however, generally be recommendable to remove the water formed during the condensation. This may be accomplished in different ways, e. g. by centrifugation. After the removal of the water the resin may preferably be dissolved or emulsified in a volatile organic solvent, if desired with the aid of an emulsifying agent. If, for example, the condensate is dissolved in ethanol, a 50% resin solution may be obtained, which is stable for a long time. If thereupon the catalyst mixture is added, a solution is obtained having a pH of 3 to 4 and which can be kept for about one month at room temperature. If it is desired to keep the solution of low-pressure resin for a longer time, it is recommendable to add the catalyst mixture only just before the use. Such a solution is extremely suitable for impregnating fabrics, which may be composed of textile material or paper.

After the impregnation the volatile solvent is evaporated, and the treated fabric, either or not after molding, is subjected to a curing process.

Of course also plasticisers, such as phthalic acid esters, various fillers, pigments, etc. may be added. The use of plasticisers, however, is not necessary.

Example I 3 kg. of phenol and 3 kg. of a 33% formaldehyde solution were mixed and heated while stirring. As soon as the temperature of the mixture had risen to 50° C., 0.3 L. of 25% ammonia was added and heating continued while stirring. At the beginning of the reaction heating was stopped and not until the reaction was decreasing the heating was resumed.

About 50 min. after the beginning of the condensation the reaction mixture was cooled down to 50° C. and the water was separated by centrifugation, to produce a resin still containing 8 to 10% by weight of water. The yield amounted to about 4.2 kg., or 3.8 kg. of water-free resin.

Thereupon so much denaturated 96% ethanol was added that a 50% resin solution was obtained, i. e. about 3.4 kg.

To this solution a mixture of 380 g. selenium dioxide and a quantity of technical resorcinol varying from 190 to 380 g. was added.

Example II

A so-called utility-fabric, having 17½ warp threads per cm. and 13¾ woof threads per cm., and having a weight of 64 g. per m.$^2$, was impregnated with the solution, prepared according to Example I, which solution contained 10% of resorcinol and 10% of selenium dioxide based on the weight of the resin in the solution. After drying 60 to 80 g. of resin were found to have been absorbed per m.$^2$ of fabric. If impregnation was carried out with a more dilute resin solution, less resin was absorbed.

Thereupon the treated fabric was cured at a temperature of 100° C. and a pressure of 5 kg./cm.$^2$ for 10 min. The material thus acquired excellent mechanical properties. So the bending strength was 1030 kg./cm.$^2$ and the resistance to shock 110 kg./cm.$^2$, measured with Schopper Dynstat 116.

Example III 3 kg. of phenol and 3 kg. of a 33% formaldehyde solution are mixed and heated to 50° C. while stirring, whereupon 0.3 l. of 25% ammonia solution is added and heating is continued while stirring. As soon as the condensation reaction starts, the heating is interrupted and if necessary the reaction speed is reduced by cooling. After the first violent development of heat having ceased, heating is resumed till about 50 min. after the beginning of the condensation.

Thereupon the reaction mixture is cooled down to about 50° C. and the water is removed either by centrifugation or by vacuum distillation at low temperature (max. 50° C.). From the resulting resin a 50% solution is made with denaturated 96% ethanol, and 10% of resorcinol and 10% of selenium dioxide (calculated on the resin) are added. With this solution a cyclostyle paper having a weight of 788 g. per m.$^2$ is impregnated. The impregnated paper thereby takes up a quantity of resin of 700 to 800 g. per m.$^2$. The paper is dried, either in the atmosphere or by a heated air current of 40° C., whereafter it may be pressed into layers (e. g. 10 to 20 layers) under a pressure of 2½ to 3 kg./cm.$^2$ at a temperature of 100° C. for 10 min. In this way plates are formed having excellent mechanical properties and water-resistance, which for example may be used for making panels or for other building purposes.

Example IV

With the solutions, as described in Examples I and III, also mats may be impregnated, composed of cotton waste, artificial silk waste, wool waste, straw fibres and other fibrous materials. After drying in an air current of about 40° C. such mats may be pressed, either in one or in several layers, at pressures which may vary widely from 2½ kg./cm.$^2$ upwards. The pressing temperature is 100° C., the pressing time 12 to 15 min. The pressing may be accomplished between flat plates, but also between dies imparting a certain shape to the material. In the latter way articles may be molded which are more or less hollow and thin-walled, e. g. trunks, boxes, hat boxes, spherical objects and the like. The nature of the material after curing at 100° C. depends on the quantity of absorbed resin (which may be adjusted by variation of the solution) and on the pressure applied. Thus flexible, somewhat porous to harder non-porous sheeted materials are obtained.

I claim:

1. Process of producing a rapid curing, low pressure phenol-formaldehyde resin which comprises reacting phenol and formaldehyde in stoichiometric proportions to form the phenol formaldehyde resin and water, removing the water from said resin, dissolving said resin in a volatile organic solvent, and adding to said resin solution about 15-25% by weight of the resin of a hardening agent consisting essentially of about 2-1 parts by weight of resorcinol and about 1-2 parts by weight of selenium dioxide.

2. Process of producing a rapid curing, low pressure phenol-formaldehyde resin which comprises adding at least about 10% by weight of the resin of a hardening agent consisting essentially of about 2-1 parts by weight of resorcinol and about 1-2 parts by weight of selenium dioxide to the preformed phenol-formaldehyde resin, and recovering a rapid curing phenol-formaldehyde resin.

3. Process of producing a rapid curing, low pressure phenol-formaldehyde resin which comprises reacting phenol and formaldehyde in stoichiometric proportions to form the phenol-formaldehyde resin, and adding to said resin about 15-25% by weight of said resin of a hardening agent consisting essentially of about 2-1 parts by weight of resorcinol and about 1-2 parts by weight of selenium dioxide.

4. Process of producing a rapid curing, low pressure phenol-formaldehyde resin which comprises reacting phenol and formaldehyde in stoichiometric proportions to form the phenol-formaldehyde resin, and adding to said resin about 20% by weight of said resin of a hardening agent consisting essentially of resorcinol and selenium dioxide in equal amounts.

5. A laminated material of excellent mechanical properties, impregnated with a rapid curing, low pressure phenol-formaldehyde resin containing a hardening agent consisting essentially of about 10% resorcinol and about 10% selenium dioxide by weight of the resin, each of said layers being impregnated prior to assembly thereof.

6. Shaped articles of excellent mechanical properties comprising a fibrous material impregnated with a rapid curing, low pressure phenol-formaldehyde resin containing about 15-25% by weight of the resin of a hardening agent consisting essentially of about 2-1 parts by weight of resorcinol and about 1-2 parts by weight of selenium dioxide.

ARIE ANTON JOHANNES SIGTERMANS.

REFERENCES CITED

The following references are of record in the file of this patent:

UNITED STATES PATENTS

| Number | Name | Date |
|---|---|---|
| 1,802,390 | Novotny | Apr. 28, 1931 |
| 2,398,361 | Daniels | Apr. 16, 1946 |

FOREIGN PATENTS

| Number | Country | Date |
|---|---|---|
| 28,187 | Great Britain | of 1913 |